Patented Feb. 2, 1932

1,843,354

UNITED STATES PATENT OFFICE

ABRAHAM SIDNEY BEHRMAN, OF CHICAGO, ILLINOIS

HALOGEN RECOVERY

No Drawing.   Application filed October 30, 1929.  Serial No. 403,668.

This invention relates to the treatment of liquids and fluids for purposes of recovering, purifying and/or separating various valuable chemical constituents.

More especially, the invention relates to the treatment of relatively dilute mixtures or solutions containing valuable substances which cannot be recovered practically or economically by methods or processes now available.

A principal object of the invention is the recovery of iodine and bromine from solutions or mixtures containing the compounds of these elements, or containing the elements themselves.

Another object of the invention is to provide a method for the separation of chlorine, bromine, and iodine and their compounds from solutions or mixtures in which two or more of these elements or their compounds are present.

A further object of the invention is the purification of certain solutions or mixtures containing the halogens and their compounds.

Other objects of the invention will become apparent on the further reading of this disclosure and of the appended claims.

As an illustration of the invention, to which it is by no means restricted, it will be described in its application to aqueous solutions, such as brine solutions. Many naturally occurring brines and waters contain appreciable amounts of bromides, iodides, iodates, and other compounds of bromine and iodine, principally of the alkali metals and alkaline earth metals; but almost always the amounts are far too small to warrant evaporation or any other available process as a method of recovery. Moreover, the same liquids that contain these valuable compounds in such small amounts frequently also contain very high concentrations of relatively valueless compounds, such as common salt, so that a successful method of recovery of the values must provide both for the separation of the valuable halogens and halides from the relatively valueless compounds, and for the concentration of the separated material to an extent where final recovery is practical and economical.

The method of the present invention provides for such separation and concentration, and does so simply, effectively and economically.

In a copending application, Serial No. 370,737, filed June 13, 1929, there is described a method for the production of hydrochloric acid, and other halogen acids, by the action of a halogen, water in the liquid state, and carbon. The carbon employed for this purpose is preferably the "activated" variety, of which several suitable grades are now commercially available. The chemical reactions by which the synthesis described presumably functions, may be shown in the following condensed equations:

(1)   $2Cl_2 + 2H_2O + C = 4HCl + CO_2$
(2)   $2Br_2 + 2H_2O + C = 4HBr + CO_2$

Using the process of the copending application referred to, it is readily possible to prepare hydrochloric and hydrobromic acids. I have found, however, that it is not possible to produce hydriodic acid in this manner, apparently for the reason that iodine is adsorbed directly by the carbon, and without the oxidation of the carbon shown in the above equations. There may be some casual connection between this exceptional behavior of iodine and the fact that the direct combination of hydrogen and chlorine is a strongly exothermic reaction and the combination of hydrogen and bromine moderately strongly exothermic, while at ordinary temperatures hydrogen and iodine will normally not combine at all. Whether or not such causal connection actually exists, it seems to have been established definitely that iodine is adsorbed directly by the activated carbon without the production of appreciable quantities of hydriodic acid; but, while this explanation appears to be a reasonable one, the successful performance of the process of the invention is not dependent on the accuracy of this hypothesis.

The iodine adsorbed by the carbon may be recovered in several ways. One of these methods comprises the extraction or removal of the iodine from the carbon with suitable solvents. Another method consists in heating the carbon to a relatively high temperature, considerably in excess of the boiling point of iodine. These two methods of recovery will be described in greater detail in discussing typical examples of the application of the processes of this invention.

When an aqueous solution containing free bromine is passed through, or otherwise treated with, activated carbon, a considerable quantity of the hydrobromic acid first formed is adsorbed by the carbon; and until this adsorption capacity is satisfied, little, if any, hydrobromic acid appears in the treated or effluent liquid. By employment of sufficient carbon, and by choice of proper operating conditions, it therefore becomes possible to separate bromine from dilute solutions by first converting it to hydrobromic acid, then adsorbing the hydrobromic acid in carbon, and subsequently recovering the hydrobromic acid from the carbon by dry distillation or other appropriate means.

By utilizing the basic discoveries herein disclosed, it is therefore possible to effect a concentration and separation of iodine and its compounds from the other halogens and their compounds; to prepare a solution of hydrobromic acid from a solution of a bromide, and to use this reaction, if desired, as a means of separating bromine from its compounds in dilute solution; to prepare bromides of many metals by the reaction of the hydrobromic acid formed as above with the appropriate metal or metal compounds, such as the hydroxide or oxide; to determine quantatively the amounts of bromine and iodine and their compounds in a given solution; to sterilize and even render temporarily antiseptic by means of iodine an activated carbon water filter, which sterilization is impossible with chlorine due to the practically instantaneous conversion of the chlorine to hydrochloric acid; and to provide the mechanism for many other useful and valuable advances in those industrial and scientific fields in which the substances involved have an important place.

I shall not attempt to enumerate or describe all of the possible applications of the processes of this invention. Several typical and illustrative cases will be given, it being understood, however, that the applications of the invention are not limited to these examples.

*Case I.*—It is desired to recover iodine from dilute solutions of its compounds.

Essential steps in this case are the liberation of the iodine by some suitable reagent, the adsorption of the iodine by the carbon, and the recovery of the iodine as such or in the form of a compound from the carbon.

The nature of the reagent employed for liberating the iodine from its compounds will naturally vary with the type of compound. If, for example, the iodine is present as the iodide, e. g. sodium iodide, chlorine will be found an effective and economical reagent, functioning by substitution according to the following equation:

Or, if the iodine is present as the iodate, e. g. potassium iodate, a reducing agent such as sulfur dioxide may be employed:

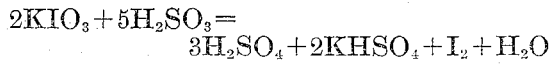

When chlorine is the liberating agent employed, a sufficient quantity is usually added to the liquid to insure liberation of all the iodine. In liquids which contain appreciable amounts of oxidizable organic matter or other chlorine-consuming substances, it will frequently be found necessary to provide enough chlorine to oxidize or satisfy such materials. In general, I prefer to employ sufficient chlorine to provide a slight but definite excess over that required for the liberation of the iodine—except, of course, in those cases where the results of the addition of the excess chlorine would be objectionable, as for example, by the formation of undesirable compounds of chlorine and iodine.

The liquid containing the free iodine is then treated with the carbon, preferably by passing the liquid through a bed of the carbon, the rate of flow being such as to permit substantially complete adsorption of the iodine.

In many cases the liquid to be treated may contain iodine both in the form of iodides and iodates. In such cases it is preferred to liberate the iodine from one type of compound, e. g. the iodates, and follow this liberation by adsorption of the iodine by carbon. Subsequently the iodine in the iodides may be liberated by treatment with chlorine, the liberated iodine being then adsorbed by a second carbon treatment. This sequence may also be reversed. Under some circumstances the iodine may be liberated from both iodides and iodates before the liquid is subjected to a carbon treatment.

The alkalinity or acidity of the aqueous iodine solution when treated with the carbon may vary over a wide range, with substantially complete removal of iodine. This range includes most of the waters and brines occurring in nature. Such waters and brines seldom have an alkalinity much higher than that producing the first appearance of color with phenolphthalein, that is, the pH seldom greatly exceeds about 8.3. It is generally desirable and economical when treating such waters or brines not to change substantially their alkalinity or acidity before the iodine is liberated.

After the carbon has adsorbed the desired amount of iodine, recovery of the iodine may be effected in any desired manner. Two processes which I have employed successfully are (1) distillation of the carbon and (2) extraction with solvents.

In distillation of the carbon, I have found that it is usually necessary to heat the carbon considerably above the boiling point of iodine (184.3° C.). In fact, I have frequently found it necessary to carry the heating to dull redness of the carbon, to drive off the iodine, the vapors of which may then be collected and condensed.

In extracting the adsorbed iodine from the carbon by means of solvents, a number of the usual solvents may be employed, such as alcohol, ether, carbon disulfide, etc. Solvents which remove the iodine unchanged, or less preferably those which will form chemical compounds readily removable from the carbon, may be employed. A solution of potassium iodide is particularly advantageous. An alcoholic aqueous solution of this character may be prepared according to the directions of the United States Pharmacopoeia for making tincture of iodine, with omission of the iodine specified in those directions. The composition of the extracting solution is 50 grams of potassium iodide, 50 grams of water, and about 960 cubic centimeters of ethyl alcohol. Separation of the iodine, extracted by this solution from the carbon, may be effected by any suitable means; but it will be obvious that by properly controlling the conditions of the extraction, the requisite amount of iodine will be extracted to give the solution the composition of U. S. P. tincture of iodine. Or, if a greater amount of iodine is extracted than is required for the tincture, the concentration of iodine may be adjusted by dilution with the proper quantity of the alcohol-water-potassium iodide solution above described.

A convenient method of separating the recovered iodine from the alcohol-water-potassium iodide solution used in extraction of iodine from the carbon, is to evaporate the solution to dryness, collecting and recovering the alcohol-water vapor mixture evaporated. The dry residue is then heated to drive off the iodine, the vapors of which are then collected and condensed; or the iodine may be removed and recovered in any other manner desired. The residue of potassium iodide may be used in making up a fresh extracting solution, in which the alcohol (and water) recovered from the evaporation may also be advantageously employed. The extraction and evaporation cycle thus becomes virtually a closed system, as far as the extracting solution is concerned, the losses of the constituents of this solution being relatively minor ones.

As disclosed above, in the preferred processes of the present invention the iodine is both adsorbed and recovered in substantially elemental condition. The adsorption of the iodine in carbon and its recovery by sublimation or by extraction with a potassium iodide solution are examples of such preferred processes.

*Case II.*—Both iodine and bromine are to be recovered from solutions of their compounds.

In this case the reagent or reagents used for liberating the halogens are employed either in (1) amount sufficient to liberate only the iodine, which is then removed and recovered as in Case I; after which the liquid is further treated for the liberation of bromine—e. g. as with chlorine—and then subjected to the action of carbon, for the conversion of the bromine into hydrobromic acid; or (2) the iodine and bromine are liberated simultaneously, in which case the iodine may be separated by treatment with a limited quantity of carbon sufficient to adsorb all of the iodine but not sufficient to adsorb a substantial amount of the bromine or the hydrobromic acid formed from it. If, after the carbon treatment, the solution containing bromine is alkaline, it is acidified. The solution is then subjected to treatment with a relatively large quantity of fresh carbon, by which the hydrobromic acid formed will be adsorbed, and from which it may be recovered by distillation or other means; or the hydrobromic acid solution may be caused to react on some metal, e. g. silver, which is capable of forming an insoluble bromide, or upon some metallic compound which is capable of forming a readily recoverable or utilizable bromine compound. The bromine may also be recovered from the carbon by treatment with an aqueous solution of an alkali such as caustic potash or potassium carbonate.

In some cases the bromine and iodine are entirely adsorbed in and by a relatively large quantity of carbon, and the iodine and hydrobromic acid (and any uncombined bromine) separately removed from the carbon by fractional distillation. This method of separation is made possible by the widely separated boiling points of the substances involved.

In utilizing the processes of this invention, it is sometimes desirable to give the liquid a pretreatment which will result in a greater efficacy or economy of the subsequent and principal treatment. For example in the case of a certain oil well brine from Oklahoma, it was found very advantageous to coagulate with aluminum sulfate the oil and other colloidal matter, and then to remove the coagulated material by filtration. The alkalinity of the raw brine was 32 parts per million, expressed in terms of calcium carbonate; the pH was 6.3. After coagulation the alkalinity was 26 parts per million and the pH was 6.3. The filtered brine was then treated with chlorine in excess, a dosage of about 20 parts per million being employed. The chlorinated water was then passed through a bed of an activated carbon prepared from certain Texas peats. Like the other carbons which it is preferable to use for the adsorption of iodine, this carbon, as a result of its method of preparation, presents an unusually large amount of active internal surface which has been freed of hydrocarbons. The iodine was adsorbed by the carbon, and recovered by extracting the carbon with the alcohol-water-potassium iodide solution above described. The iodine thus recovered was found to be equivalent to a concentration of 4.8 milligrams per liter of the original brine. No iodine could be detected in the brine following the treatment with carbon.

By the term "carbon" is included activated carbons, wood charcoals, bone char, lignite and equivalents. Chlorine may be replaced by other agents adapted to liberate the iodine and/or bromine in part or in whole. Strong oxidizing agents may frequently be used for this purpose under suitable conditions.

It will be obvious that the ramifications and modifications of the present invention are numerous, and that many deviations and departures from it may be made without lessening the dominant importance of the basic processes herein disclosed. All such modifications are contemplated within the scope of the invention, as defined and set forth in the appended claims.

What is claimed is:

1. A process of recovering bromine and iodine from aqueous solutions which comprises adsorbing the bromine and iodine in carbon and then removing and separating the same.

2. A process of recovering bromine and iodine from brines containing the same which comprises liberating the iodine, separating with carbon the iodine so liberated, then liberating the bromine, and recovering the bromine by treatment with carbon.

3. A process of recovering iodine from aqueous solutions which comprises adsorbing the iodine in carbon and then extracting the iodine from the carbon with an alkali metal iodide solution.

4. A process of separating lighter halogens from iodine in aqueous solution which comprises subjecting them to treatment with carbon to convert the lighter halogens to the halogen acids and then separating the halogen acids from the iodine.

5. A process of preparing iodine free of chlorine which comprises treating the aqueous solution of an iodide with excess chlorine, then treating with carbon to convert the chlorine into hydrochloric acid and separating the hydrochloric acid from the iodine.

6. A process for obtaining halogens from aqueous solutions containing colloidal matter, which comprises treating said solution with a coagulating agent for colloidal matter, separating the resultant coagulated material from the solution, adsorbing the halogens in carbon, and recovering the halogens from the carbon.

7. A process for recovering iodine from solutions containing the same, which comprises adsorbing the iodine in carbon, and extracting the iodine from the carbon with an alcoholic aqueous solution of an alkali metal iodide.

8. A process for recovering iodine from solutions containing the same, which comprises adsorbing the iodine in carbon, extracting the iodine from the carbon with an alcoholic aqueous solution of an alkali metal iodide, evaporating said alcoholic aqueous solution to dryness, and heating the residue from said evaporated solution to separate the iodine.

9. In the process of separating the lighter halogens from the heavier halogens, the step of treating an aqueous solution of the free halogens with carbon.

10. A process for recovering iodine from aqueous solutions containing the same, which comprises adsorbing the iodine in carbon, and treating the iodine-containing carbon with an aqueous solution of an iodide capable of dissolving the iodine from the carbon.

11. The process of recovering bromine from aqueous solutions containing the same, which comprises reacting said solution with carbon to form hydrogen bromide, adsorbing said hydrogen bromide in carbon, separating the aqueous solution from the hydrogen bromide-containing carbon, and recovering the hydrogen bromide from the carbon.

12. The process of recovering bromine from aqueous solutions containing the same, which comprises reacting said solution with carbon to form hydrogen bromide, adsorbing said hydrogen bromide in carbon, separating the aqueous solution from the hydrogen bromide-containing carbon, and recovering the hydrogen bromide from the carbon by extraction with an aqueous alkaline solution.

13. In the process of recovering bromine from an aqueous solution containing the same, the step which comprises treating said solution with carbon.

14. In the process of recovering and separating bromine and iodine, the step of treating an aqueous solution containing a mixture of the same with carbon.

In testimony whereof I have subscribed my name to the foregoing specification and claims.

ABRAHAM SIDNEY BEHRMAN.